Patented May 27, 1952

2,598,319

UNITED STATES PATENT OFFICE 2,598,319

DUSTLESS COMPOSITION FOR RUBBER COMPOUNDING AND METHOD OF MAKING SAME

Monte C. Throdahl, St. Albans, W. Va., assignor to Monsanto Chemical Company, St. Louis, Mo., a corporation of Delaware No Drawing. Application September 8, 1950, Serial No. 183,899

31 Claims. (Cl. 260—306.5)

This invention relates to improved dust free compositions and methods of making same. More particularly it relates to a method of making bead-like agglomerates especially suitable for rubber compounding.

Additives such as mineral oils, vegetable oils, salts of fatty acids and the like have heretofore been mixed with difficultly dispersible rubber compounding materials in order to produce formulations having improved properties but disadvantages still remain. One disadvantage is that the compositions met with in the art which contain these additives, some of which have as much as 6% additive, still possess varying amounts of extremely finely divided particles such that when the composition is shaken or poured from a container some of the fines float in the air as dust. This dust is objectionable not only because it represents a waste of material but because of its irritating effect on plant personnel. Another disadvantage is one encountered in compounding operations in that many of the additives employed are plasticizers, as for example the mineral oils and as a result any material coated therewith tends to stick to the rotor of the Banbury or to the mill rolls forming agglomerate flakes, and filaments which persist and resist dispersion. Still another disadvantage is that the additives are incorporated in the dried pulverulent material followed by tumbling or as part of the grinding operation for reducing the rubber compounding material to the appropriate particle size. These operations are expensive and time consuming and produce neither a cake free nor dust free product.

It has been found in accordance with this invention that the above objections are substantially overcome, without in any way impairing the value of the materials as rubber compounding agents by stirring an aqueous slurry of a water insoluble or a substantially water insoluble rubber compounding agent in the presence of stearic acid and heating to form agglomerates of bead-like nature in which the organic particles are preferentially wet by the additive. The adsorbed particles are readily and quickly separated by any suitable filtration operation, and upon drying a dustless, free-flowing composition is obtained. Additionally, the compositions exhibit good storage properties in that the do not pack under normal storage pressure and temperature. The size and rate of formation of the beads or bead-like compositions may be controlled by varying the time and/or rate of agitation, or by varying the temperature during the agitation, or by any combination of two or more of the aforesaid variables. The pH of the aqueous slurry prior to the additive addition also influences the results. For example, stearic acid readily forms a soap in an alkaline medium so that strong heating in an alkaline slurry in the presence of stearic acid should be avoided. It is advantageous to have the slurry distinctly acid even before the stearic acid is added although it is possible to adjust the pH after it is added. In general pH values of 5 to 7 of aqueous slurries of most rubber compounding agents are satisfactory. By proper manipulation of the variables depending upon the particular rubber compounding agent a substantially spontaneous formation of beads or bead-like compositions results. A few preliminary experiments will suffice to establish the optimum conditions for forming the agglomerates.

Proportions of approximately 33 to 55 parts by weight of stearic acid per 100 parts by weight of the rubber compounding agent are unique in providing exceptionally desirable dispersing properties at normal processing temperatures although proportions outside this range may be employed and in some instances may actually be preferred. If the temperature of mixing is below the melting point of stearic acid, the superior dispersing properties of the material are sacrificed and bead-like agglomerates containing no more than 10 parts by weight of stearic acid give better results. Furthermore, a very high proportion of active ingredient is sometimes required.

Among the rubber compounding materials which have been prepared in the form of dustless bead-like agglomerates are thiazole sulfides, as for example, 2,2'-dithiobis benzothiazole and mercaptobenzothiazole; the thiazole sulfenamides, as for example, N-cyclohexyl-2-benzothiazole sulfenamide, the thiuram sulfides, as for example, tetramethyl thiuram monosulfide and tetramethyl thiuram disulfide, the zinc dithiocarbamates, as for example, zinc dimethyl dithiocarbamate and zinc diethyl dithiocarbamate, the thiazyl thioalkyl substituted ureas, as for example, 1,3-bis(2-benzothiazolyl mercaptomethyl)urea. Sulfur and rubber antioxidants, as for example, acid polymerized 2,2,4-trimethyl-1,2-dihydroquinoline are also suitable, and bead-like agglomerates have been prepared from them. Diphenyl guanidine has also been successfully employed although the temperature should be kept at a minimum for the successful agglomeration of such strongly basic accelerators. This invention is particularly adaptable to the formation of bead-like agglomerates of those water insoluble rubber compounding agents having melting points above 100° C.

The general conditions found applicable for converting water insoluble organic accelerators, antioxidants, sulfur and other compounding materials into the new improved form are, stirring an aqueous dispersion of the material to be agglomerated in the presence of sufficient waxy material to form agglomerates and heating the stirred suspension. If the waxy material is a solid the temperature should be sufficient to liquefy it but insufficient to melt the material being agglomerated. Superatmospheric pressures are unnecessary and temperatures up to the refluxing temperature of the slurry at atmospheric pressure are satisfactory. The size of the particles can be controlled by manipulation of the variables previously mentioned such as time, temperature, and proportions. In some instances the agglomerates grow very rapidly after once forming so that when the desired size is reached further growth may be arrested by sudden cooling as for example, by quenching with a large excess of cold water. The bead-like agglomerates may then be filtered off, washed, dried, and packaged. While the rate of cooling may be manipulated to control the nature of the product, it has now been found that more reproducible results are obtained by continuing the heating and stirring at the selected temperature until particulate agglomerates of the desired size are produced and terminating the reaction immediately. It is considered desirable that the particles be larger than 80 mesh but no larger than 4 mesh. The smaller sizes are generally preferred and the process can be controlled so as to give essentially quantitative yields of agglomerates all less than 8 mesh but larger than 40 mesh. Excellent yields of particle sizes between 20 and 80 mesh have also been obtained. By proper control of the variables the particles have to the naked eye the appearance of uniform size and shape. However they are actually somewhat irregular and variable in shape and further characterized by a range of sizes. They may be essentially spherical especially the larger sizes and usually give this impression. However close examination often reveals a popcorn appearance, probably as the result of several essentially spherical agglomerates combining. Although uncompressed the agglomerates possess excellent mechanical stability but are nevertheless friable and disperse readily into rubber. The bulk density is usually from 5 to 5.5 lbs./gal. For example agglomerates larger than 40 but smaller than 8 mesh composed of 30 parts stearic acid and 70 parts tetramethyl thiuram monosulfide gave a bulk density of 5.2 lbs./gal. Substituting tetramethyl thiuram disulfide for the monosulfide gave 5.5 lbs./gal.

EXAMPLE I 2,2'-dithiobis benzothiazole is a well known difficultly dispersible rubber accelerator which is prepared by the oxidation of mercaptobenzothiazole. While many and varying methods for oxidizing mercaptobenzothiazole to 2,2'-dithiobis benzothiazole have been described, for purposes of illustration the invention will be described employing the method of Carr, U. S. 2,265,347. However, it is to be understood that this and the following examples are merely illustrative of the invention and in nowise are to be considered limitative thereof.

An aqueous solution containing approximately 9% sodium mercaptobenzothiazole was prepared by dissolving the necessary amount of commercial mercaptobenzothiazole in the required amount of an aqueous alkaline solution. Upon filtering off the insoluble residue the pale yellow solution was heated slightly above room temperature and while vigorously agitating, chlorine gas was introduced into the space above the solution. As the chlorine was absorbed by the solution 2,2'-dithiobis benzothiazole rapidly precipitated as fine particles. (A large portion of a representative sample of the precipitate upon drying passed through a 200 mesh screen and exhibited considerable dustiness.) Upon completion of the reaction the slurry if still alkaline was adjusted to a pH of 7 or below and while still agitating heated to about 80–85° C. and thereto was added approximately 43% by weight of stearic acid based upon the 2,2'-dithiobis benzothiazole content of the slurry. The slurry which possessed a pH of about 4.0 was thereupon cooled below 50° C. and as the agitation continued bead-like compositions formed and upon ceasing the agitation the beads separated from the slurry leaving a clear yellow liquid. The beads were separated by filtering through a Buchner funnel using full pressure on a standard water pump. The beads were removed after washing with water and dried at about 50° C. in an air circulating oven. The new composition so obtained was dustless, cakeless, free-flowing, composed entirely of beads containing less than 0.1% water and possesssed a weight ratio of approximately 43 parts stearic acid per 100 parts 2,2'-dithiobis benzothiazole. Substantially 100% of the beads so formed were of 8–100 mesh size, that is passed through 8 mesh but retained on 100 mesh, and approximately 90% were of 8–40 mesh size.

Employing an aqueous slurry possessing a pH of about 1 and containing by weight approximately 6.7% 2,2'-dithiobis benzothiazole, about 79% of the beads formed by the addition of approximately 43% by weight of stearic acid based upon the weight of the disulfide in the manner described above were of 8–40 mesh size.

Employing an aqueous slurry possessing a pH of about 6 and containing approximately 23.7% 2,2'-dithiobis benzothiazole, substantially 100% of the beads formed by the addition of approximately 43% by weight of stearic acid based upon the weight of the disulfide in the manner described above were of 8–20 mesh size.

Employing 1023.6 parts by weight of an aqueous slurry containing by analysis 83.9 parts by weight 2,2'-dithiobis benzothiazole, the pH was adjusted to 6.8–7.1 with sulfuric acid, 36 parts by weight stearic acid added and the mixture heated and stirred at about 85° C. for 97 minutes to form bead-like agglomerates. The slurry was immediately cooled to 39° C., filtered, and the bead-like particles washed and dried. There was obtained substantially a quantitative yield of beads of 8–40 mesh size. This illustrates the preparation by continued heating at a particular temperature.

EXAMPLE II

Substantially 140 parts by weight of finely powdered 2,2'-dithiobis benzothiazole was added to a slurry of 60 parts by weight of stearic acid in 420 parts by weight of water. While stirring the mixture was heated to a temperature within the range of 70–90° C. to effect adsorption of the stearic acid and then stirred for about 30 minutes. The solids were filtered off, washed and dried. They consisted of bead-like agglomerates all of which were larger than 40 mesh. This example illustrates the preparation of bead-like agglomerates by reslurrying the disulfide in water and also use of a concentrated slurry. In general, the more concentrated the slurry the faster the agglomerates form and they also tend to grow larger. The average bulk density is 5 lbs./gal.

EXAMPLE III

The size and uniformity of the particles may be controlled by varying the period of heating. Continued heating and stirring gradually builds up the size of the agglomerates as illustrated by this example. Substantially 100 parts by weight of very small agglomerates of 2,2'-dithiobis benzothiazole and stearic acid in the weight ratio of 100:43 all of which were smaller than 40 mesh were suspended in 900 parts by weight of water and subjected to agitation at 70-80° C. for twenty hours. The solids were then filtered off, washed and dried. 97% of the material was then retained on a 40 mesh screen, the bulk of the particles being larger than 20 mesh.

To demonstrate the rapid and improved dispersing properties of the dustless, cakeless, free-flowing compositions described above 7.1 parts by weight of 20 mesh size 43:100 weight ratio stearic acid-2,2'-dithiobis benzothiazole beads were incorporated in 10 parts natural rubber on an open compounding mill. The beads melted quickly and dispersed evenly in the rubber in about one minute, and there was no exhibition of flaking, agglomerating, filament forming, or drop-through of the stock to the pan. The master batch so compounded exhibited a minimum of tack. For comparative purposes another master batch was mixed on an open compounding mill under exactly the same conditions employing 10 parts natural rubber, 2 parts stearic acid, and 5.1 parts of a commercial 2,2'-dithiobis benzothiazole of which substantially 100% passed through a 200 mesh screen and which contained at least 2% of an oily additive. The stearic acid and the commercial accelerator were manually blended prior to the milling operation. The time of mixing or milling was over four minutes and there was exhibited flaking, agglomerating on the rolls, and drop-through of the stock to the pan. Thus, another advantage of the improved dustless composition is apparent, namely reduction in the time of milling such that the tendency to scorch or prevulcanize is minimized if not eliminated.

No significant differences in vulcanization rate were observed between the dustless stearic acid-2,2'-dithiobis benzothiazole mixtures and the straight accelerator where in the latter case adjustment was made in the compounding formula for the stearic acid present in the new dustless compositions.

EXAMPLE IV

The materials listed in the table below are illustrative of other rubber compounding materials prepared in the form of bead-like agglomerates. The method employed in this series was to disperse the material in water and add stearic acid thereto and heat the slurry to about 90° C. while stirring. While continuing the stirring the slurry was gradually cooled and the solids filtered off and dried. Particulate bead-like agglomerates were obtained in every case by combining stearic acid in the proportions set forth in the following table:

Table

| Material | Parts by Weight | Stearic Acid Parts by Weight |
|---|---|---|
| 1,2-Bis(2-benzothiazolyl mercaptomethyl) urea | 70 | 30 |
| Zinc dimethyl dithiocarbamate | 70 | 30 |
| Mercaptobenzothiazole | 70 | 30 |
| N-Cyclohexyl 2-benzothiazole sulfenamide | 70 | 30 |
| Do | 75 | 25 |
| Do | 80 | 20 |
| Do | 85 | 15 |
| Do | 90 | 10 |
| Do | 95 | 5 |
| Tetramethyl thiuram monosulfide | 70 | 30 |
| Do | 90 | 10 |
| Do | 95 | 5 |
| Tetramethyl thiuram disulfide | 70 | 30 |
| Sulfur | 70 | 30 |

It will be noted that in the above series bead-like agglomerates were prepared by heating the slurries to 90° C. and then almost immediately cooling. Prolonged heating of thiuram sulfides at temperatures this high should be avoided as some decomposition may take place. In the case of the thiuram sulfide accelerator better results are obtained by keeping the temperature within the range of 60–65° C. and continuing the heating and stirring until bead-like agglomerates of the desired size are formed. Even at this temperature the particles usually form very quickly.

EXAMPLE V

Substantially 80 parts by weight of 2,2'-dithiobis benzothiazole and 20 parts by weight of diethylene glycol monostearate were suspended in water and heated to about 55 C. while subjected to vigorous agitation. The bead-like agglomerates which formed were cooled and then filtered from the slurry, washed and dried.

EXAMPLE VI

Substantially 70 parts by weight of 2,2'-dithiobis benzothiazole and 30 parts by weight of paraffin were suspended in water and while vigorously agitating the suspension was heated to about 55° C. The mixture was then gradually cooled while continuing the stirring and the solids filtered off. In this manner there was obtained uniform bead-like agglomerates.

Although stearic acid is preferred for the reason that it is a common ingredient in a rubber stock, other fatty acids as for example lauric acid, myristic acid, and palmitic acid may be used. The invention is advantageously carried out using higher fatty acids normally solid at room temperature but is by no means limited thereto. Any fatty acid containing more than five carbon atoms can be employed. Tall oil has successfully replaced stearic acid. As noted, other waxy materials may be used in place of fatty acids.

Although the present invention has been described and illustrated in connection with certain specific embodiments, it is to be understood that modifications and variations thereof may be made without departing from the spirit or scope of the invention. This application is a continuation-in-part of Serial No. 106,328 filed July 22, 1949, now abandoned.

What is claimed is:

1. The process of making an improved dustless composition for rubber compounding which comprises subjecting to agitation an aqueous dispersion of a water-insoluble normally dusty rubber compounding agent and a waxy binder constituting about 5% to 35% of the mixture and heating above the melting point of the waxy binder but below that of the rubber compounding agent, stirring being continued until bead-like agglomerates larger than 100 mesh are formed.

2. The process of making an improved dustless composition for rubber compounding which comprises subjecting to agitation an aqueous dispersion of a water insoluble normally dusty organic accelerator and a saturated long chain fatty acid constituting about 5% to 35% of the mixture and heating above the melting point of the fatty acid but below that of the accelerator at a pH no higher than 7, the stirring being continued until bead-like agglomerates larger than 80 mesh are formed.

3. The process of making a dustless free-flowing accelerator composition further characterized by very rapid dispersion into a rubber on milling which comprises subjecting to agitation an aqueous slurry of a water insoluble organic accelerator having a pH no higher than 7 in the presence of approximately 33–55 parts by weight per 100 of the accelerator of a higher fatty acid at a temperature above the melting point of the fatty acid, subsequently lowering the temperature and removing the particles containing adsorbed fatty acid and drying them.

4. The process of making a dustless free-flowing accelerator composition further characterized by very rapid dispersion into a rubber on milling which comprises subjecting to agitation an aqueous slurry of 2,2'-dithiobis benzothiazole having a pH no higher than 7 in the presence of approximately 33–55 parts by weight per 100 of the 2,2'-dithiobis benzothiazole of stearic acid at a temperature above the melting point of the stearic acid, subsequently lowering the temperature and removing the particles containing adsorbed stearic acid and drying them.

5. The process of making a dustless free-flowing accelerator composition further characterized by very rapid dispersion into a rubber on milling which comprises neutralizing an alkaline slurry of 2,2'-dithiobis benzothiazole obtained by the oxidation of an aqueous solution of sodium mercaptobenzothiazole, adding 33–55 parts by weight per 100 of the 2,2'-dithiobis benzothiazole of a higher fatty acid, heating and stirring above the melting point of the fatty acid, subsequently lowering the temperature, removing the particles containing adsorbed fatty acid and drying them.

6. The process of making a dustless free-flowing accelerator composition further characterized by very rapid dispersion into a rubber on milling which comprises subjecting to agitation an aqueous slurry of a water insoluble accelerator of vulcanization in the presence of approximately 33–55 parts by weight per 100 of the accelerator of a waxy material solid at room temperature at a temperature above the melting point of the waxy material, gradually cooling while continuing the stirring until bead-like agglomerates larger than 100 mesh are formed, filtering and drying the particles.

7. The process of making a dustless free-flowing accelerator composition further characterized by very rapid dispersion into a rubber on milling which comprises subjecting to agitation an aqueous dispersion of a water insoluble accelerator of vulcanization in the presence of approximately 33–55 parts by weight per 100 of accelerator of stearic acid, heating and stirring below the melting point of the accelerator at a pH no higher than 7 until bead-like agglomerates larger than 80 mesh are formed.

8. The process of making a dustless free-flowing composition which comprises subjecting to agitation an aqueous slurry of 2,2'-dithiobis benzothiazole in the presence of approximately 33% to 55% by weight of a waxy material normally solid at room temperature, at a temperature above the melting point of the waxy material, lowering the temperature and removing the particles of 2,2'-dithiobis benzothiazole having the waxy material adsorbed therein.

9. The process of making a dustless free-flowing bead-like composition which comprises subjecting to agitation an aqueous slurry of 2,2'-dithiobis benzothiazole having a pH no higher than 7 in the presence of approximately 33% to 55% by weight of a fatty acid normally solid at room temperature at a temperature above the melting point of the acid, continuing the agitation until agglomerates are formed, lowering the temperature and removing the bead-like particles.

10. The process of making a dustless free-flowing accelerator composition further characterized by very rapid dispersion into a rubber on milling which comprises subjecting to agitation an aqueous dispersion of 2,2'-dithiobis benzothiazole in the presence of approximately 33–55 parts by weight per 100 of 2,2'-dithiobis benzothiazole of stearic acid, heating and stirring below about 100° C. at a pH no higher than 7 until bead-like agglomerates larger than 80 mesh are formed.

11. The process of making an improved dustless composition for rubber compounding which comprises subjecting to agitation an aqueous dispersion of a thiuram sulfide accelerator melting above 100° C. and stearic acid constituting about 5% to 35% of the mixture, heating and stirring below about 100° C. at a pH no higher than 7 until bead-like agglomerates larger than 80 mesh are formed.

12. The process of making a dustless free-flowing accelerator composition further characterized by very rapid dispersion into a rubber on milling which comprises subjecting to agitation an aqueous slurry of tetramethyl thiuram disulfide in the presence of approximately 33–55 parts by weight per 100 of the tetramethyl thiuram disulfide of stearic acid at a temperature above the melting point of the stearic acid, gradually cooling while continuing the stirring until bead-like agglomerates larger than 100 mesh are formed, filtering and drying the particles.

13. The process of making a dustless free-flowing accelerator composition further characterized by very rapid dispersion into a rubber on milling which comprises subjecting to agitation an aqueous dispersion of tetramethyl thiuram disulfide in the presence of approximately 33–55 parts by weight per 100 of the tetramethyl thiuram disulfide of stearic acid, heating and stirring below about 100° C. at a pH no higher than 7 until bead-like agglomerates larger than 80 mesh are formed.

14. The process of making a dustless free-flowing accelerator composition which comprises subjecting to agitation an aqueous dispersion of tetramethyl thiuram monosulfide and stearic acid constituting about 5% to 35% of the mixture, heating and stirring below about 100° C. at a pH no higher than 7 until bead-like agglomerates larger than 80 mesh are formed.

15. The process of making a dustless free-flowing accelerator composition further characterized by very rapid dispersion into a rubber on milling which comprises subjecting to agitation an aqueous slurry of N,N-(2-benzothiazyl thiomethyl) urea in the presence of approximately 33–55 parts by weight per 100 of the N,N-(2-benzothiazyl thiomethyl) urea of stearic acid at a temperature above the melting point of the stearic acid, gradually cooling while continuing the stirring under bead-like agglomerates larger than 100 mesh are formed, filtering and drying the particles.

16. The process of making a dustless free-flowing accelerator composition further characterized by very rapid dispersion into a rubber on milling which comprises subjecting to agitation an aqueous dispersion of 2,2'-dithiobis benzothiazole in the presence of approximately 43% by weight stearic acid on the weight of the 2,2'-dithiobis benzothiazole, heating and stirring below 100° C. at a pH no higher than 7 until bead-like agglomerates larger than 80 mesh are formed.

17. The process of making a dustless free-flowing accelerator composition further characterized by very rapid dispersion into a rubber on milling which comprises subjecting to agitation an aqueous dispersion of tetramethyl thiuram disulfide in the presence of approximately 43% by weight stearic acid on the weight of the tetramethyl thiuram disulfide, heating at 60–70° C. and stirring at a pH no higher than 7 until bead-like agglomerates larger than 80 mesh are formed.

18. An improved composition for rubber compounding consisting essentially in dustless free-flowing bead-like agglomerates larger than 100 but smaller than 8 mesh in size composed of about 5% to 35% of a waxy binder and about 95% to 65% of a water insoluble normally dusty rubber compounding agent, the agglomerates being smooth surfaced somewhat irregular and variable in size and shape and also characterized by being friable and dispersible on milling into rubber.

19. An improved composition for rubber compounding consisting essentially in dustless free-flowing bead-like agglomerates 8–40 mesh in size composed of about 5% to 35% of a saturated long chain fatty acid and about 95% to 65% of a water insoluble normally dusty rubber compounding agent, the agglomerates being smooth surfaced somewhat irregular and variable in size and shape and also characterized by being friable and dispersible on milling into rubber.

20. An improved composition for rubber compounding consisting essentially in dustless free-flowing bead-like agglomerates 8–40 mesh in size composed of about 5% to 35% of stearic acid and about 95% to 65% of a water insoluble organic accelerator of vulcanization having a melting point above 100° C., the agglomerates being smooth surfaced somewhat irregular and variable in size and shape and also characterized by being friable and dispersible on milling into rubber.

21. An improved dustless free-flowing accelerator composition further characterized by very rapid dispersion into a rubber on milling consisting essentially of an organic water insoluble accelerator of vulcanization and a saturated long chain fatty acid in a weight ratio of approximately 33–55 parts by weight per 100 of accelerator.

22. An improved dustless free-flowing accelerator composition further characterized by very rapid dispersion into a rubber on milling consisting essentially of 2,2'-dithiobis benzothiazole and stearic acid in a weight ratio of approximately 33–55 parts by weight per 100 of 2,2'-dithiobis benzothiazole.

23. An improved dustless free-flowing accelerator composition further characterized by very rapid dispersion into a rubber on milling consisting essentially of tetramethyl thiuram disulfide and stearic acid in a weight ratio of approximately 33–55 parts by weight per 100 of tetramethyl thiuram disulfide.

24. An improved dustless free-flowing accelerator composition further characterized by very rapid dispersion into a rubber on milling consisting essentially of bead-like agglomerates within the range of 8–40 mesh in size the individual particles consisting essentially of a mixture of stearic acid and a water insoluble accelerator of vulcanization the ratio of stearic acid being 33–55 parts per 100 of accelerator.

25. An improved dustless free-flowing accelerator composition further characterized by very rapid dispersion into a rubber on milling consisting essentially of bead-like agglomerates within the range of 8–40 mesh in size the individual particles consisting essentially of a mixture of stearic acid and 2,2'-dithiobis benzothiazole the ratio of stearic acid being 33–55 parts per 100 of 2,2'-dithiobis benzothiazole.

26. An improved dustless free-flowing accelerator composition further characterized by very rapid dispersion into a rubber on milling consisting essentially of bead-like agglomerates within the range of 8–40 mesh in size the individual particles consisting essentially of a mixture of stearic acid and tetramethyl thiuram disulfide the ratio of stearic acid being 33–55 parts per 100 of tetramethyl thiuram disulfide.

27. An improved dustless free-flowing accelerator composition further characterized by very rapid dispersion into a rubber on milling consisting essentially of bead-like agglomerates within the range of 8–40 mesh in size the individual particles consisting essentially of a mixture of stearic acid and N,N-(2-benzothiazyl thiomethyl) urea the ratio of stearic acid being 33–55 parts per 100 of N,N-(2-benzothiazyl thiomethyl) urea.

28. An improved dustless free-flowing accelerator composition further characterized by very rapid dispersion into a rubber on milling consisting essentially of bead-like agglomerates within the range of 8–40 mesh in size the individual particles consisting essentially of a mixture of stearic acid and 2,2'-dithiobis benzothiazole the ratio of stearic acid being 43 parts per 100 of 2,2'-dithiobis benzothiazole.

29. An improved dustless free-flowing accelerator composition further characterized by very rapid dispersion into a rubber on milling consisting essentially of bead-like agglomerates within the range of 8–40 mesh in size the individual particles consisting essentially of a mixture of stearic acid and tetramethyl thiuram disulfide the ratio of stearic acid being 43 parts per 100 of tetramethyl thiuram disulfide.

30. An improved dustless free-flowing accelerator composition consisting essentially of bead-like agglomerates within the range of 8–40 mesh in size, the individual particles consisting essentially of a mixture of stearic acid and tetramethyl thiuram monosulfide, the ratio of stearic acid being 5% to 35% of the total tetramethyl thiuram monosulfide and stearic acid.

31. An improved dustless free-flowing accelerator composition further characterized by very rapid dispersion into a rubber on milling consisting essentially of bead-like agglomerates within the range of 8-40 mesh in size, the individual particles consisting essentially of a mixture of stearic acid and zinc dimethyl dithiocarbamate, the ratio of stearic acid being 33-55 parts per 100 of zinc dimethyl dithiocarbamate.

MONTE C. THRODAHL.

REFERENCES CITED

The following references are of record in the file of this patent:

UNITED STATES PATENTS

| Number | Name | Date |
|---|---|---|
| 2,326,984 | Tomlin | Aug. 17, 1943 |
| 2,343,835 | Smith et al. | Mar. 7, 1944 |